April 11, 1939. J. B. OLSON 2,154,108
FUEL-OIL CONTROL VALVE
Filed Sept. 5, 1936
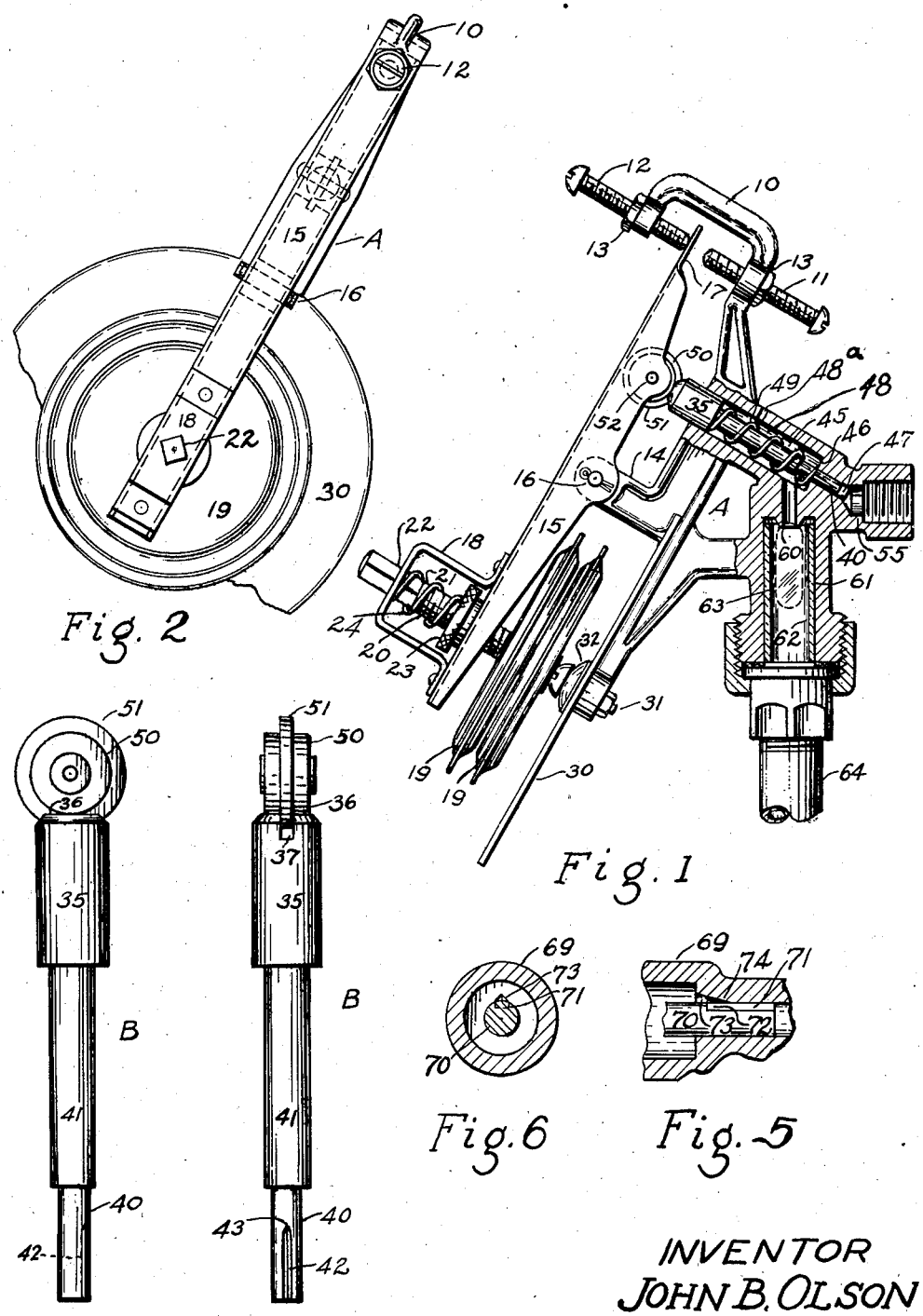
INVENTOR
JOHN B. OLSON
BY A S Krolz
Attorney Patented Apr. 11, 1939

2,154,108

UNITED STATES PATENT OFFICE 2,154,108

FUEL-OIL CONTROL VALVE

John B. Olson, Fort Atkinson, Wis., assignor to James Mfg. Co., Fort Atkinson, Wis.

Application September 5, 1936, Serial No. 99,532

7 Claims. (Cl. 236—89)

The present invention relates to fuel-oil control valves which are adapted to control the supply of oil to heating stoves, furnaces and the like. Valves of the class, for obvious reasons, must be absolutely reliable. This is not easy to attain because they are usually controlled by thermally sensitive devices which are in themselves frail and sensitive. The valve must therefore act definitely and easily.

Valves of the class are apt to become clogged by foreign matter particularly if they are designed to maintain a pilot flame which requires a very small flow of oil. An accumulation of air at the valve is apt to cause what is known as an air lock and stop the flow of oil; therefore the valve must be designed to prevent these difficulties.

An object of the present invention is to provide a single valve having separate means for conveniently regulating the maximum and minimum flow, the off position of the valve providing a very fine adjustment so the desired amount of oil may be supplied for positively maintaining a pilot or keeper flame which usually requires somewhere near 40 or 50 drops of oil per minute.

A further object is to provide a valve which is self cleaning and whereby when once adjusted to the maximum and minimum flow, it will remain so regardless of a change of temperature adjustment, which is accomplished by means entirely separate from the flow adjustments.

A further object of the present invention is to provide means whereby the closed position of the valve is yieldingly held thus to prevent injury to the device by further expansion of the thermal wafers.

To these and other useful ends the present invention consists of parts and combinations thereof or their equivalents, and mode of operation as hereinafter described and claimed and shown in the accompanying drawing in which:

Fig. 1 is a side elevation of my improved device the valve housing being shown in section.

Fig. 2 is a fractional top view of the device shown in Figure 1.

Fig. 3 is an enlarged side view of the valve rod and its stem showing the operating roller in position.

Fig. 4 is an enlarged top view of the device illustrated in Figure 3.

Figs. 5 and 6 illustrate modifications.

I have illustrated the preferred form of my invention wherein the frame is designated by reference character A. The forward end is U shaped as at 10 and is, at each side provided with screw threaded adjusting bolts 11 and 12 each being supplied with a lock nut 13, the bolts being on the same plane and the adjacent ends being adjustably spaced for a purpose which will hereinafter appear.

I provide a post 14 on the upper side of frame A and about midway its length, to which lever 15 is pivoted by means of pin 16. This lever has preferably an inverted U shape in cross section as illustrated and is formed from flat stock, the front end being flattened out as at 17. This member 17 is positioned between the ends of screws 11 and 12. On the rear end of lever 15 I secure a U shaped bracket 18.

I provide preferably two wafers 19—19 each containing a thermally sensitive liquid. These wafers are secured together at their centers, the upper wafer having attached thereto, a threaded bolt 20, the threads terminating as at 21, the remainder of the bolt being square and extending through a loosely fitting square opening in bracket 18 as at 22, the threaded portion of the bolt passing loosely through an opening in lever 15.

A knurled nut 23 is screw threaded on bolt 20 and a spring 24 is positioned on bolt 20 which is adapted to yieldingly hold the nut 23 against lever 15 but will permit the nut to raise; thus if the wafers continue to expand after the lever member 17 has contacted bolt 11, nut 23 will raise thus to avoid undue pressure on the lever or injury to the wafers.

I provide a wafer shield 30 which is secured to frame A by means of bolt 31. The head of this bolt is positioned concentric with the wafers and rests on washer 32, to thereby position the head whereby when the wafers are contracted by a temperature below a desired point, lever member 17 will be permitted to move upward until it contacts bolt 12 and if the wafers are expanded by sufficient heat, member 17 may be caused to move downward until it contacts the end of bolt 11.

I provide a valve and means whereby lever member 17 is moved upward to yieldingly act against the expansion of the wafers as follows:

The valve in its entirety is designated by reference character B and comprises guide stem 35 having a flat end surface as at 36 and a transverse groove 37. Valve rod 40 and valve stem 41 are of a suitable length and diameter, each being formed integral with member 35. Valve rod 40 is provided with a groove 42 extending from the end of the stem to a point as at 43. The cutting tool for this groove being V shaped and circular will cause the groove to be gradually reduced in width and depth for a short distance at its end and to terminate in a sharp point. This V groove acts as a metering valve by more or less covering or uncovering the tapered part of the groove; thus from full opening it may be progressively closed until the minimum flow is reached, or vice versa.

Housing A is provided with a chamber 45 which terminates as at 46 and closely embraces stem 35. A chamber 47 is concentric with member 45 and closely embraces rod 40; thus an annular chamber 48 is formed which provides an enclosure for spring 49, the spring acting to force stem 35 outward against a roller 50. This roller is provided with a flange 51 which is loosely embraced by groove 37. Roller 50 is rotatably mounted between the depending flanges of lever 15 by means of pin 52. Clearly friction between lever 15 and stem 35 will be reduced to a minimum by member 50 and stem 35 will be held from turning by flange 51.

Thus it will be seen that when wafers 19 expand, stem 35 and rod 40 will be moved downward against the pressure of spring 49; this movement may continue until member 17 contacts bolt 11 and when the wafers contract, spring 49 will act to raise plunger 35 and hold the bottom wafer against the head of bolt 31. This movement may continue until member 17 contacts bolt 12.

In operation bolt 12 is adjusted to permit uncovering enough of the end of groove 42 to extend into chamber 45 to provide fuel-oil flow sufficient for the desired maximum flame in the stove and bolt 11 is adjusted so as to permit the point of groove 42 to extend into chamber 48 far enough to permit enough oil to flow to maintain a low or pilot flame in the stove. Thus it will be seen that the wafers may be set to maintain any desired temperature to which the wafers are exposed by turning member 23, and that bolts 11 and 12 may be adjusted to fix the maximum and minimum flow of oil through the valve.

A novel feature of the present invention is the groove 42 and its position at the top of rod 40, this position being secured by flange 51 and groove 37. It will be noted that groove 42 at its inner end is substantially on the same plane as the top of the inlet opening 55 which is preferably screw threaded for the inlet pipe connected as indicated. Thus an air lock cannot occur since any air that enters chamber 55 will immediately move through groove 42 to chamber 48.

Another novel feature of the device is the action of valve rod 40 and groove 42, wherein the oscillationg movement of the groove end into and out of chamber 48 will tend to clear the groove of foreign matter. It may be said that the end of chamber 47 at 46, is the valve seat and that the tapered part of groove 42 is the valve; an ideal device in that it requires a long movement between the wide open and closed positions, the opening and closing action being progressive with this movement from wide open to an opening the size of a pin point or less. Clearly roller 50 will provide a frictionless operating connection between stem 35 and lever 15.

A novel feature of my invention is the simple means provided for observing the flow of oil. I provide a depending nozzle 60 having a depending enlarged chamber 61 in which I position a glass tube 62. I provide two oppositely positioned openings 63 (shown in dotted lines) whereby one may observe the flow of oil from nozzle 60, the orifice of which is connected to chamber 48. Thus the oil permitted to flow through the valve, will escape through this nozzle, and it will leave this nozzle drop by drop and be easily observed through the side openings and the number of drops per minute will indicate to the operator, the correct position for screws 11 and 12. For the pilot flame the customary amount of oil is between 40 and 50 drops per minute and for the maximum flame the usual number of drops per minute is from 200 to 250. A suitable fitting is provided whereby glass 62 may be inserted into chamber 61. This fitting is provided with a threaded opening at its bottom for the reception of pipe 64 which leads to the stove or furnace burner. In order to prevent an air lock in chamber 45 I provide an orifice 48a which extends into this chamber.

It will be seen that when wafers 19 contract because the temperature to which they are exposed falls below what is desired and as called for by the adjustment of nut 23, spring 49 will be permitted to move more of the tapered end of groove 42 into chamber 48. This movement may continue until member 17 contacts bolt 12. When the temperature rises, the wafers will expand and move the groove end out of chamber 48 and this movement may continue until member 17 contacts bolt 11 which is adjusted to supply enough oil to maintain a low fire; thus the valve is opened and closed progressively by the wafers in response to temperature demands as called for by the adjustment of nut 23.

Thus it will be seen that I have provided a thermally sensitive control of a novel valve; that the valve will be kept clear of foreign matter; that the operator may easily adjust the device for the desired temperature and easily control the maximum and minimum oil flow; that the expansion of the wafers is yieldingly controlled; that the operating parts act through frictionless means and that the device is simple, strong and reliable.

In Figures 5 and 6 I illustrate a modified form of valve and seat wherein 69 designates the housing which may be exactly like member A of Figure 1, except I provide preferably, an inverted V shaped groove 73 in the housing which terminates in a point as at 74. I provide a valve rod 70 having a groove 71. This groove, however, terminates abruptly as at 72. Thus the metering of oil will be exactly as in Figure 1.

I have shown and described the preferred form of my invention. Many detail changes are understood to be possible without departing from the spirit and scope of the invention as recited in the appended claims.

I claim:

1. A fuel oil regulating device of the class described, comprising an integrally formed valve rod and guide stem therefor, the stem having a considerably greater diameter than the rod, an integrally formed housing having chambers adapted to closely embrace said stem and the free end of said rod, the free end of said stem protruding through its chamber and the inner end and its chamber adapted to cooperate with said rod to thereby form an annular chamber, a uniform groove in said rod parallel thereto and extending a distance from the free end thereof, the inner end of said groove for a relatively short distance being V-shaped and gradually reduced in depth and width and terminating in a point to thereby form a metering inlet valve to said annular chamber, a spring positioned on said rod within said annular chamber and being adapted to open said valve, an inlet connection to said rod chamber adjacent the free end of said rod, an oil outlet in the bottom of and an air vent in the top of said annular chamber, a pivotally mounted lever having a roller which operatively engages the protruding end of said stem and a thermally sensitive device operatively connected to said lever and adapted to permit said spring to open said valve when the temperature at said thermal device falls and to close said valve when the temperature rises.

2. A device as recited in claim 1 including; adjustable stops adapted to limit the opposite movements of said lever, thereby to stop the opening and closing movement of said valve at predetermined positions.

3. A fuel oil regulating device of the class described, comprising an integrally formed valve rod and guide stem therefor, the stem having a considerably greater diameter than the rod, an integrally formed housing having chambers adapted to closely embrace said stem and the free end of said rod, the free end of said stem protruding through its chamber and the inner end of said stem and its chamber adapted to cooperate with said rod to thereby form an annular chamber, a uniform V-shaped groove in said rod parallel thereto and extending a distance from the free end thereof the inner end for a relatively short distance being gradually reduced in depth and width and terminating in a point to thereby form a metering inlet valve to said annular chamber, a spring positioned on said rod within said annular chamber and being adapted to open said valve, an inlet connection to said rod chamber adjacent the free end of said rod, an oil outlet in the bottom of and an air vent in the top of said annular chamber, thermally controlled means operatively connected to said protruding end and having means thereby to permit said valve to open when the temperature falls and to close said valve when the temperature rises.

4. A fuel oil regulating device of the class described, comprising an integrally formed valve rod and guide stem therefor, the stem having a considerably greater diameter than the rod, an integrally formed housing having chambers adapted to closely embrace said stem and the free end of said rod, the free end of said stem protruding through its chamber and the inner end and its chamber adapted to cooperate with said rod to thereby form an annular chamber, a uniform V-shaped groove in said rod being parallel thereto and extending a distance from the free end thereof the inner end for a relatively short distance being gradually reduced in depth and width and terminating in a point to thereby form a metering inlet valve to said annular chamber, a spring positioned on said rod within said annular chamber and being adapted to open said valve, an inlet connection to said rod chamber adjacent the free end of said rod, an oil outlet in the bottom of and an air vent in the top of said annular chamber, a pivotally mounted lever having a roller which operatively engages the protruding end of said stem and a thermally sensitive device operatively connected to said lever and adapted to permit said spring to open said valve when the temperature at said thermal device falls and to close said valve when the temperature rises, said rod and stem being positioned at a considerable angle from vertical and said groove being positioned on the top side of said rod, means on said roller adapted to prevent said rod from turning in its chamber.

5. A fuel oil regulating device of the class described, comprising an integrally formed valve rod and guide stem therefore, the stem having a considerably greater diameter than the rod, an integrally formed housing having chambers adapted to closely embrace said stem and the free end of said rod, the free end of said stem protruding through its chamber and the inner end and its chamber adapted to cooperate with said rod to thereby form an annular chamber, a uniform V-shaped groove in said rod parallel thereto and extending a distance from the free end thereof, the inner end of said groove for a relatively short distance being gradually reduced in depth and width and terminating in a point to thereby form a metering inlet valve to said annular chamber, a spring adapted to open said valve, an inlet connection to said rod chamber adjacent the free end of said rod, an oil outlet in the bottom of and an air vent in the top of said annular chamber, a pivotally mounted lever having a roller which operatively engages the protruding end of said stem and a thermally sensitive device operatively connected to said lever and adapted to permit said spring to open said valve when the temperature at said thermal device falls and to close said valve when the temperature rises, said rod and stem being positioned at a considerable angle from vertical and having said groove on the top side of said stem, means on said roller adapted to prevent said rod and stem from turning, a heat deflector plate being larger in diameter than said thermal device and being mounted on said housing and positioned adjacent said thermal device, said deflector being positioned whereby said thermal device is positioned between it and the source of heat.

6. A device as recited in claim 1 and in which; said rod being positioned at a considerable angle from vertical, said rod terminating a short distance from the inlet end of said rod chamber and said inlet being positioned whereby its top surface intersects the top surface of the inlet end of said rod.

7. A fuel oil regulating device having a valve structure for regulating the flow of oil therethrough by means of a thermally sensitive device, characterized by the fact that, said valve structure comprising an integrally formed valve rod and guide stem therefor, the stem having a considerably larger diameter than the rod, an integrally formed housing having chambers adapted to closely embrace said stem and rod, the inner end of said stem and its chamber and the adjacent end of said rod cooperating to form an annular chamber, a uniform groove in said rod being parallel thereto and extending a distance from the free end thereof, the inner end of said groove for a relatively short distance being gradually reduced in width and depth and terminating in a point to thereby form a metering inlet valve for said chamber, an oil inlet connection to said rod chamber adjacent the free end of said rod, an oil outlet in the bottom of and an air vent in the top of said annular chamber, said rod and stem being positioned at a considerable angle from vertical and said groove being positioned on the top side of said rod.

JOHN B. OLSON.